(12) United States Patent
Sanjo

(10) Patent No.: US 9,573,627 B2
(45) Date of Patent: Feb. 21, 2017

(54) INSTRUMENT PANEL REINFORCEMENT STRUCTURE

(71) Applicant: TOYOTA JIDOSHA KABUSHIKI KAISHA, Toyota-shi (JP)

(72) Inventor: Shizuo Sanjo, Nisshin (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/911,892

(22) PCT Filed: Jun. 10, 2014

(86) PCT No.: PCT/JP2014/065830
§ 371 (c)(1),
(2) Date: Feb. 12, 2016

(87) PCT Pub. No.: WO2015/033642
PCT Pub. Date: Mar. 12, 2015

(65) Prior Publication Data
US 2016/0200366 A1    Jul. 14, 2016

(30) Foreign Application Priority Data

Sep. 6, 2013  (JP) .................................. 2013-185476

(51) Int. Cl.
*B62D 25/14*    (2006.01)
*B60K 37/04*    (2006.01)

(52) U.S. Cl.
CPC ............. *B62D 25/145* (2013.01); *B60K 37/04* (2013.01); *B60K 2350/2052* (2013.01)

(58) Field of Classification Search
CPC .................. B62D 25/145; B60K 37/04; B60K 2350/2052
USPC ............................................................ 296/70
See application file for complete search history.

(56) References Cited

FOREIGN PATENT DOCUMENTS

| DE | 10 2005 031 357 A1 | 1/2006 |
|---|---|---|
| FR | 2 911 315 A1 | 7/2008 |
| JP | 2003-118426 A | 4/2003 |
| JP | 2003-300426 A | 10/2003 |
| JP | 2009-73461 A | 4/2009 |
| JP | 2010-64709 A | 3/2010 |
| JP | 2010-079169 A | 4/2010 |

OTHER PUBLICATIONS

International Search Report and Written Opinion issued Sep. 26, 2014, in PCT/JP2014/065830 filed Jun. 10, 2014.

*Primary Examiner* — Pinel Romain
(74) *Attorney, Agent, or Firm* — Oblon, McClelland, Maier & Neustadt, L.L.P.

(57) ABSTRACT

An instrument panel reinforcement structure has: a housing (24), that is made of metal and is disposed within an instrument panel (16), of a head-up display device (20) that projects image information onto a front windshield glass (14); and an instrument panel reinforcement (18) that is made of metal, and extends along a vehicle transverse direction within the instrument panel, and is joined to the housing.

3 Claims, 3 Drawing Sheets

FIG.3
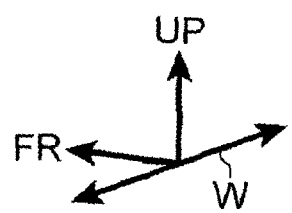
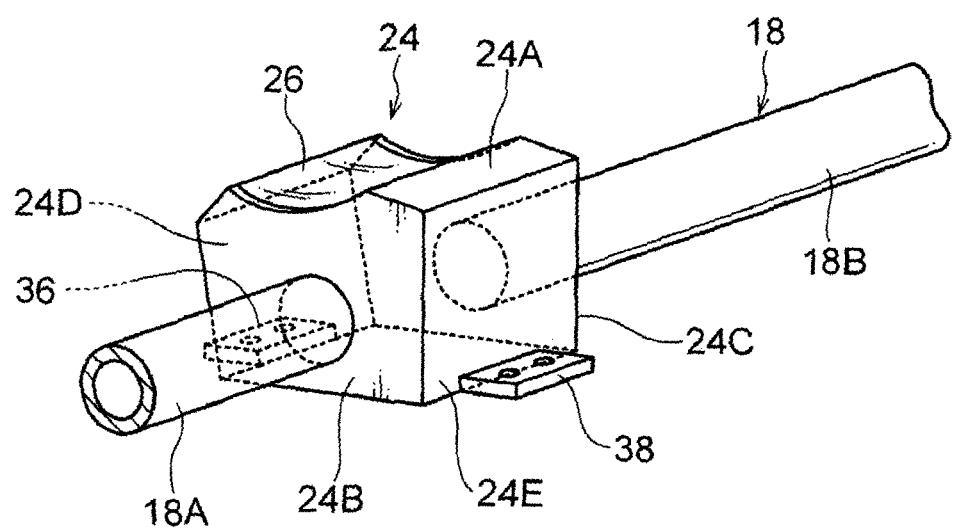

INSTRUMENT PANEL REINFORCEMENT STRUCTURE

TECHNICAL FIELD

The present invention relates to an instrument panel reinforcement structure.

BACKGROUND ART

Japanese Patent Application Laid-Open (JP-A) No. 2010-079169 discloses a technique in which, in order to make it such that the interior of the housing of a head-up display device does not overheat, a heat dissipating member is provided at the housing, and the heat within the housing is dissipated (exhausted) to the exterior via this heat dissipating plate.

SUMMARY OF INVENTION

Technical Problem

In consideration of the above-described circumstances, an object of the present invention is to obtain an instrument panel reinforcement structure that can effectively dissipate heat that is within the housing of a head-up display device.

Solution to Problem

An instrument panel reinforcement structure relating to a first aspect of the present invention has: a housing, that is made of metal and is disposed within an instrument panel, of a head-up display device that projects image information onto a front windshield glass; and an instrument panel reinforcement that is made of metal, extends along a vehicle transverse direction within the instrument panel, and is joined to the housing.

In the instrument panel reinforcement structure relating to the first aspect of the present invention, a housing, that is made of metal, of a head-up display device that projects image information onto a front windshield glass, is disposed within the instrument panel. Further, within the instrument panel, the instrument panel reinforcement that is made of metal extends along the vehicle transverse direction, and this instrument panel reinforcement is joined to the housing.

By forming the housing of the head-up display device of metal in this way, the housing itself can, as a heat sink, dissipate heat that is within the housing. Further, by joining this housing to the instrument panel reinforcement that is made of metal, the heat that is dissipated by the housing can be further dissipated via the instrument panel reinforcement. Namely, within the instrument panel, the heat that is within the housing can be dissipated effectively.

In an instrument panel reinforcement structure relating to a second aspect of the present invention, in the instrument panel reinforcement structure relating to the first aspect of the present invention, the instrument panel reinforcement is divided in the vehicle transverse direction, and a divided pair of instrument panel reinforcements are joined respectively to a pair of side walls of the housing, which side walls are disposed along a vehicle longitudinal direction and face one another in the vehicle transverse direction.

In the instrument panel reinforcement structure relating to the second aspect of the present invention, the instrument panel reinforcement is divided in the vehicle transverse direction, and the housing is disposed between the pair of divided instrument panel reinforcements.

In an instrument panel reinforcement structure relating to a third aspect of the present invention, in the instrument panel reinforcement structure relating to the first aspect or the second aspect of the present invention, mounting portions, that mount a placed part that is disposed within the instrument panel, are formed at the housing.

In the instrument panel reinforcement structure relating to the third aspect of the present invention, mounting portions, that mount a placed part that is disposed within the instrument panel, are formed at the housing. Therefore, there is no need to form these mounting portions as separate parts, and the number of parts can be decreased.

Advantageous Effects of Invention

The instrument panel reinforcement structure relating to the first aspect of the present invention has the excellent effect that heat that is within the housing of a head-up display device can be dissipated effectively.

The instrument panel reinforcement structure relating to the second aspect of the present invention has the excellent effect that, due to the instrument panel reinforcement overlapping the housing as seen in a vehicle side view, space-saving within the instrument panel can be devised.

The instrument panel reinforcement structure relating to the third aspect of the present invention has the excellent effect that, by decreasing the number of parts, costs can be reduced.

BRIEF DESCRIPTION OF DRAWINGS

FIG. 3 is a schematic perspective view showing main portions of the instrument panel reinforcement structure relating to the present embodiment.

DESCRIPTION OF EMBODIMENTS

An instrument panel reinforcement structure relating to an embodiment of the present invention is described hereinafter by using the drawings. Note that arrow FR that is shown appropriately in these drawings indicates the vehicle front side, arrow UP indicates the vehicle upper side, and arrow W indicates the vehicle transverse direction. Further, in the following description, when longitudinal and vertical directions are used, they mean the longitudinal of the vehicle longitudinal direction and the vertical of the vehicle vertical direction unless otherwise stated.

Structure of Instrument Panel Reinforcement Structure

Figure 1:
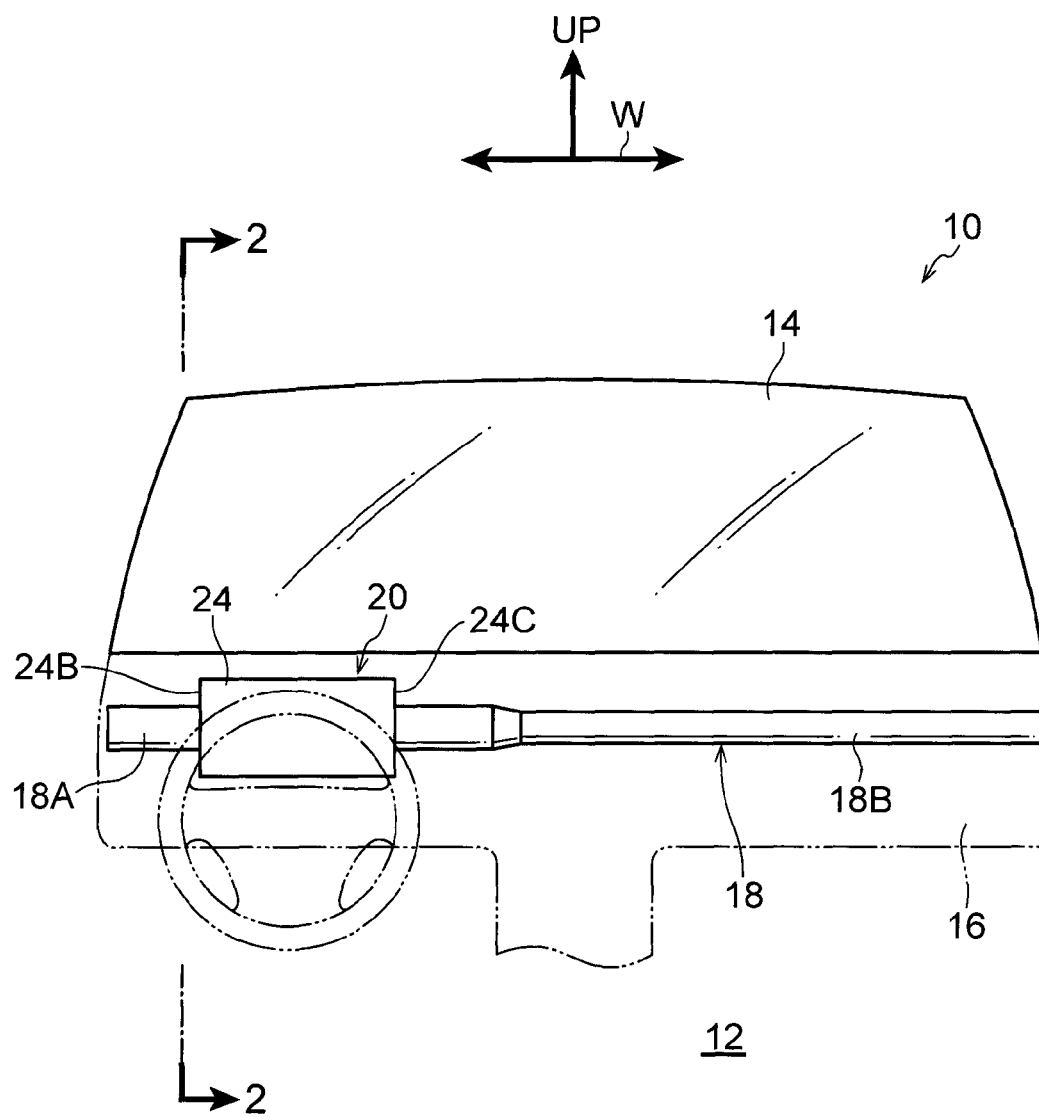
FIG. 1 is a schematic front view seen from a vehicle cabin inner side and showing an instrument panel reinforcement structure relating to the present embodiment.

First, an instrument panel reinforcement structure relating to the present embodiment is described. As shown in FIG. 1, a front windshield glass (hereinafter called "front glass") 14 is provided at the upper portion side of the vehicle longitudinal direction front portion of the interior of a vehicle cabin 12 at a vehicle 10 such as an automobile or the like. An instrument panel 16 is disposed beneath the front glass 14.

The instrument panel 16 is mounted to an instrument panel reinforcement 18. The instrument panel reinforcement 18 is formed in the shape of a hollow rod and of a metal such as an aluminum alloy or iron or the like, and spans between unillustrated front pillars at the left and right of the vehicle body. The instrument panel reinforcement 18 is a portion of the vehicle skeleton members, and structures a portion of the instrument panel reinforcement structure.

A head-up display device (a so-called HUD system) 20 is disposed at the interior of the instrument panel 16 at the driver's seat side (here, the left side in the drawing). In the present embodiment, a combination meter 22 is provided at the vehicle transverse direction left side of the instrument panel 16, and, as shown in FIG. 1, this vehicle 10 is a left-hand drive vehicle. Note that the instrument panel reinforcement structure relating to the present invention may be applied to a right-hand drive vehicle.

This head-up display device 20 displays, at the driver's seat side of the front glass 14, basic vehicle information such as the traveling speed of the vehicle 10 and the speed limit of the road in cooperation with the systems of instruments such as meters and the like, for example. In addition to this vehicle information, the traveling direction can be displayed by an arrow in cooperation with a car navigation system, and display for warning the driver by using sensors that sense obstacles also can be carried out. Note that information that is needed at the time of driving the vehicle, including such information, are called so-called driving information.

Figure 2:
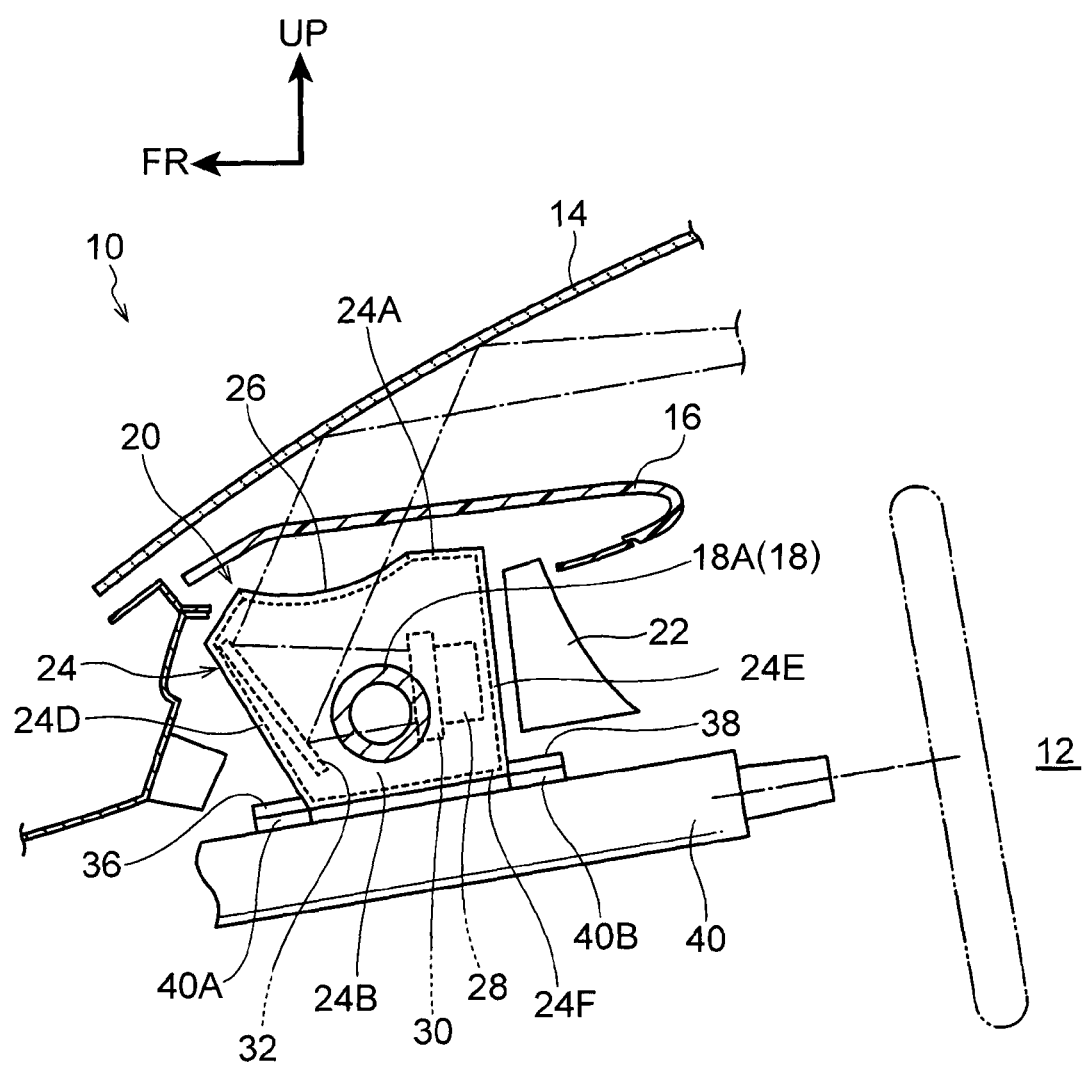
FIG. 2 is a schematic sectional view showing a state cut along line 2-2 of FIG. 1.

As shown in FIG. 2, the head-up display device 20 has a housing 24 that is shaped as a hollow box. The housing 24 is formed of a metal such as aluminum or the like that maintains the needed rigidity and also has high thermal conductivity. A transparent acrylic plate 26 is fit-in at a top wall portion 24A of the housing 24, and light can be transmitted therethrough.

Further, for example, a light source portion 28 that is structured by LEDs or the like, a display panel 30 such as a liquid crystal panel or the like, a reflecting mirror 32, and the like are disposed within the housing 24. Light illuminated from the light source portion 28 causes an image of the vehicle information and the like, that is displayed on the display panel 30, to be reflected at the reflecting mirror 32 and pass-through the acrylic plate 26 and be projected as a virtual image onto a predetermined position of the front glass 14.

Here, as shown in FIG. 3, the above-described instrument panel reinforcement 18 is divided in the vehicle transverse direction into an instrument panel reinforcement 18A and an instrument panel reinforcement 18B. These instrument panel reinforcements 18A, 18B are respectively welded to side walls 24B, 24C, that are disposed along the vehicle longitudinal direction and face one another in the vehicle transverse direction, of the housing 24. Namely, the instrument panel reinforcement 18 is joined to the housing 24 in a state of overlapping the housing 24 as seen in a vehicle side view. In this state, the instrument panel reinforcement 18 spans between the unillustrated front pillars via the housing 24.

On the other hand, a mounting portion 36, that is rectangular plate shaped and juts-out toward the front side from the lower portion of a front wall 24D that is positioned at the front portion of the housing 24, is formed. Further, a mounting portion 38, that is rectangular plate shaped and juts-out toward the rear side from the lower portion of a rear wall 24E that is positioned at the rear portion of the housing 24, is formed. As shown in FIG. 2, these mounting portions 36, 38 can respectively planarly contact mounting brackets 40A, 40B that are provided at a steering column 40 that serves as a placed part. The steering column 40 can be mounted to the mounting portions 36, 38 via unillustrated bolts.

Operation/Effects of Instrument Panel Reinforcement Structure

The operation and effects of the instrument panel reinforcement structure relating to the present embodiment are described next. The housing 24 of the head-up display device 20 that is shown in FIG. 2 and FIG. 3 is formed of metal. Therefore, the housing 24 itself can, as a heat sink, dissipate the heat that is within the housing 24. Accordingly, there is no need to separately provide a heat dissipating member at the housing 24, and the housing 24 can be made to be compact by that much, and efficient utilization of the space within the instrument panel 16 can be devised.

Further, the instrument panel reinforcements 18A, 18B that are made of metal are welded respectively to the side walls 24B, 24C of the housing 24. Therefore, the heat that has been dissipated by the housing 24 can be transferred to the instrument panel reinforcements 18A, 18B, and heat can be further dissipated via these instrument panel reinforcements 18A, 18B. Namely, at the interior of the instrument panel 16, the heat that is within the housing 24 can be dissipated efficiently.

Further, the instrument panel reinforcements 18A, 18B are welded to the side walls 24B, 24C of the housing 24, respectively. Namely, the instrument panel 18 is joined to the housing 24 in a state of overlapping the housing 24 as seen in a vehicle side view. Accordingly, as compared with a case in which the instrument panel reinforcement 18 and the housing 24 do not overlap as seen in a vehicle side view, efficient utilization of the space within the instrument panel 16 can be devised.

As described above, in accordance with the present embodiment, the heat that is within the housing 24 of the head-up display device 20 can be dissipated, and space-saving within the instrument panel 16 can be devised.

Further, in the present embodiment, the instrument panel reinforcement 18 is divided in the vehicle transverse direction, and the divided pair of instrument panel reinforcements 18A, 18B are welded to the side walls 24B, 24C of the housing 24, respectively. Due thereto, all of the instrument panel reinforcement 18 overlaps the housing 24 as seen in a vehicle side view. Accordingly, as compared with a case in which only a portion of the instrument panel reinforcement 18 overlaps the housing 24, space-saving within the instrument panel 16 can be devised more.

Moreover, in the present embodiment, the mounting portion 36 is formed at the front wall 24D of the housing 24, and the mounting portion 38 is formed at the rear wall 24E, and the steering column 40 can be mounted thereto. Due thereto, there is no need to form mounting portions, for mounting the steering column 40, as separate parts, and the number of parts can be decreased. Accordingly, in accordance with the present embodiment, costs can be reduced by decreasing the number of parts.

Other Embodiments

In the present embodiment, as shown in FIG. 3, the instrument panel reinforcement 18 is divided into the instrument panel reinforcement 18A and the instrument panel reinforcement 18B in the vehicle transverse direction. Further, the housing 24 is joined between the instrument panel reinforcement 18A and the instrument panel reinforcement 18B. However, the present invention is not limited to this. For example, the housing 24 may be joined to the end portion, at the driver's seat side, of the instrument panel reinforcement 18, without dividing the instrument panel reinforcement 18.

Further, in the present embodiment, as shown in FIG. 2 and FIG. 3, the instrument panel reinforcements 18A, 18B are welded to the side walls 24B, 24C of the housing 24 respectively, and the entire instrument panel reinforcement 18 is set so as to overlap the housing 24 as seen in a vehicle side view. However, it is not absolutely necessary for the entire instrument panel reinforcement 18 to overlap the housing 24 as seen in a vehicle side view. However, from the standpoint of aiming for saving space within the instrument panel 16, at least a portion of the instrument panel reinforcement 18 may be disposed so as to overlap the housing 24.

Moreover, from the standpoint of effectively dissipating the heat that is within the housing 24, it is not absolutely necessary that the instrument panel reinforcement 18 and the housing 24 overlap as seen in a vehicle side view. For example, although not illustrated, the housing 24 may be mounted above the instrument panel reinforcement 18 via brackets that are formed of a metal such as aluminum or the like. Further, a mounting seat may be formed at the instrument panel reinforcement 18 or the housing 24 so that the housing 24 is directly mounted to the top portion of the instrument panel reinforcement 18.

Still further, the mounting portions 36, 38 in the present embodiment are not limited to being used for mounting the steering column 40, and it suffices for the mounting portions 36, 38 to be structures that mount a placed part that is disposed within the instrument panel 16. Further, these mounting portions 36, 38 do not necessarily have to be formed at the front wall 24D and the rear wall 24E of the housing 24, and may be formed at a bottom wall 24F of the housing 24.

An embodiment of the present invention has been described above, but the present invention is not limited to the above, and may, of course, be implemented by being modified in various ways, other than the above, within a scope that does not deviate from the gist of the present invention.

The disclosure of Japanese Patent Application No. 2013-185476 is, in its entirety, incorporated by reference into the present Description. All publications, patent applications, and technical standards mentioned in the present Description are incorporated by reference into the present Description to the same extent as if such individual publication, patent application, or technical standard was specifically and individually indicated to be incorporated by reference.

The invention claimed is:

1. An instrument panel reinforcement structure comprising:
    a housing of a head-up display device that is configured to project image information onto a front windshield glass, said housing being made of metal and being disposed within an instrument panel; and
    an instrument panel reinforcement that is made of metal, extends along a vehicle transverse direction within the instrument panel, and is joined to the housing,
    wherein the housing is shaped as a hollow box, and
    the instrument panel reinforcement is joined to the housing in a state of overlapping the housing as seen in a vehicle side view.

2. The instrument panel reinforcement structure of claim 1, wherein the instrument panel reinforcement is divided in the vehicle transverse direction, and a divided pair of instrument panel reinforcements are joined respectively to a pair of side walls of the housing, which side walls are disposed along a vehicle longitudinal direction and face one another in the vehicle transverse direction.

3. The instrument panel reinforcement structure of claim 1, wherein mounting portions, that mount a placed part that is disposed within the instrument panel, are formed at the housing.

* * * * *